(12) United States Patent
Takahashi et al.

(10) Patent No.: US 10,824,582 B2
(45) Date of Patent: Nov. 3, 2020

(54) COMMUNICATION APPARATUS, COMMUNICATION METHOD, PROGRAM, AND COMMUNICATION SYSTEM

(71) Applicant: Sony Semiconductor Solutions Corporation, Kanagawa (JP)

(72) Inventors: Hiroo Takahashi, Kanagawa (JP); Sonfun Lee, Kanagawa (JP); Naohiro Koshisaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/087,404

(22) PCT Filed: Apr. 7, 2017

(86) PCT No.: PCT/JP2017/014458
§ 371 (c)(1),
(2) Date: Sep. 21, 2018

(87) PCT Pub. No.: WO2017/183483
PCT Pub. Date: Oct. 26, 2017

(65) Prior Publication Data
US 2019/0354503 A1 Nov. 21, 2019

(30) Foreign Application Priority Data
Apr. 22, 2016 (JP) ................. 2016-086588

(51) Int. Cl.
*G06F 13/42* (2006.01)
(52) U.S. Cl.
CPC .. *G06F 13/4282* (2013.01); *G06F 2213/0016* (2013.01)
(58) Field of Classification Search
None
See application file for complete search history.

(56) References Cited

U.S. PATENT DOCUMENTS

2005/0223260 A1 10/2005 Kinstler

FOREIGN PATENT DOCUMENTS

JP 2000-099448 A 4/2000
JP 2002-175269 A 6/2002

*Primary Examiner* — Idriss N Alrobaye
*Assistant Examiner* — Dayton Lewis-Taylor
(74) *Attorney, Agent, or Firm* — Michael Best & Friedrich LLP

(57) ABSTRACT

There is provided a communication apparatus, including: a transmission/reception unit that transmits/receives a signal to/from a different communication apparatus; and a recovery signal transmission instruction unit that instructs the transmission/reception unit to transmit a recovery signal for recovering communication with the different communication apparatus that is out of working order, the recovery signal including at least a first command, the first command prescribing that no processing is to be executed in the different communication apparatus that is in working order.

17 Claims, 7 Drawing Sheets

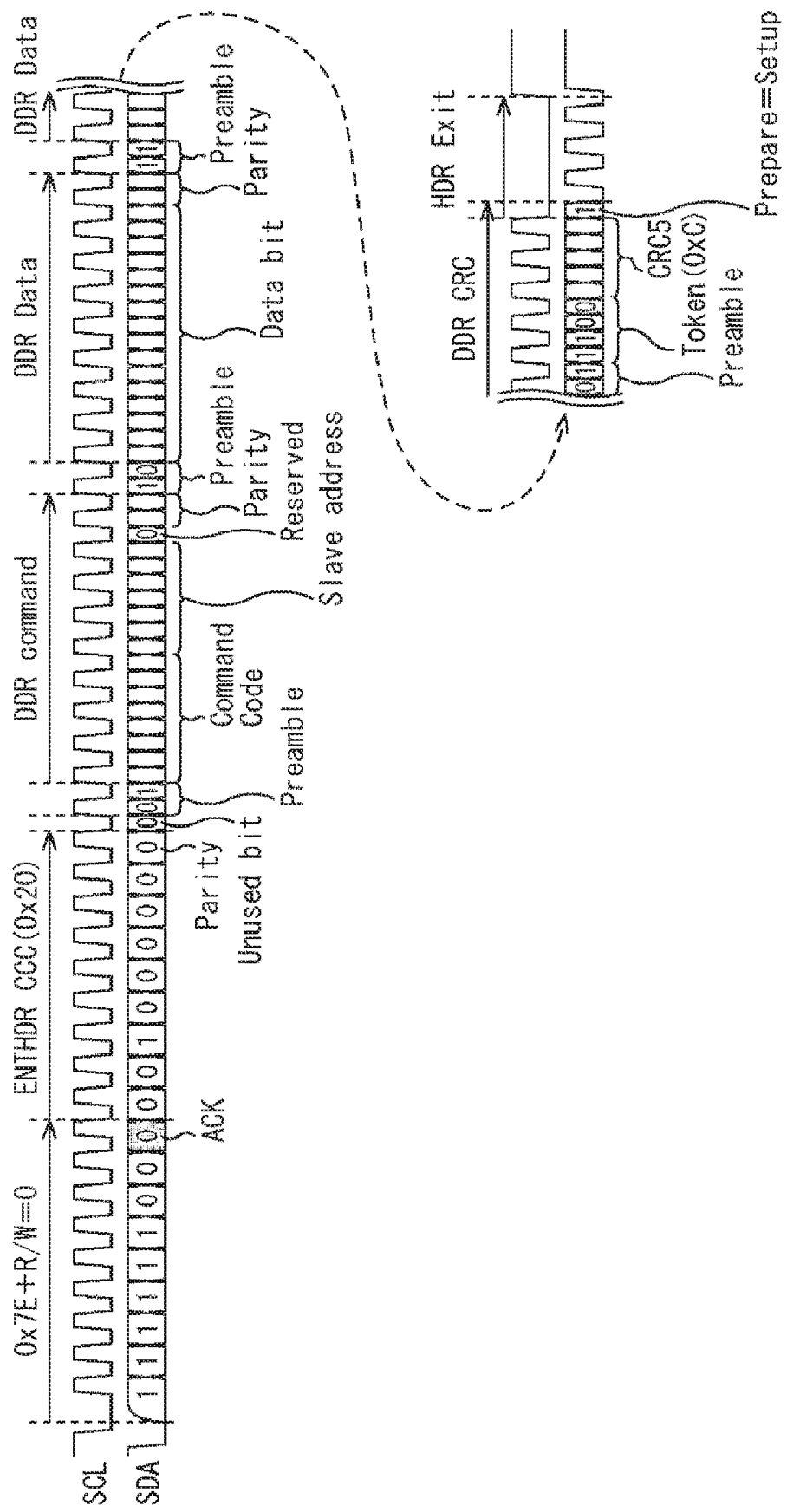
F I G. 3

COMMUNICATION APPARATUS, COMMUNICATION METHOD, PROGRAM, AND COMMUNICATION SYSTEM

TECHNICAL FIELD

The present disclosure relates to a communication apparatus, a communication method, a program, and a communication system, and particularly to a communication apparatus, a communication method, a program, and a communication system that are capable of performing communication more reliably.

CROSS REFERENCE TO RELATED APPLICATIONS

This application claims the benefit of Japanese Priority Patent Application JP 2016-086588 filed Apr. 22, 2016, the entire contents of which are incorporated herein by reference.

BACKGROUND ART

In the past, for example, an I2C (Inter-Integrated Circuit) has been often used as a bus IF (Interface) used for communication between a plurality of devices via a bus in a board on which the plurality of devices are mounted.

Further, in recent years, an increase in the speed of the I2C is desired to be achieved, and an I3C (Improved Inter Integrated Circuit) is being prescribed as the next-generation standards. In the I3C, a master and a slave are capable of performing bidirectional communication by using two signal lines. For example, data transfer (write transfer) from the master to the slave and data transfer (read transfer) from the slave to the master can be performed.

For example, in Japanese Patent Application Laid-open No. 2000-99448, a digital data processing system in which a host processor and a sub-system controller are connected to each other by the I2C is disclosed. Further, in Japanese Patent Application Laid-open No. 2002-175269, a method of realizing a communication protocol arranged in the layered state on the upper part of a standard I2C protocol is disclosed.

CITATION LIST

Patent Literature

PTL 1: Japanese Patent Application Laid-open No. 2000-99448
PTL 2: Japanese Patent Application Laid-open No. 2002-175269

SUMMARY OF INVENTION

Technical Problem

Incidentally, in the case where serial data or serial clock transmitted via the two signal lines has an error in the above-mentioned I3C, for example, the slave sometimes stops responding to the master. At this time, the master makes attempts to recover the communication of the slave by performing a predetermined recovering method on the slave. The signal transmitted at this time could cause the slave that is in working order to malfunction, and it is supposed to be difficult to perform normal communication.

The present disclosure has been made in view of the above circumstances to be able to perform communication more reliably.

Solution to Problem

A communication apparatus according to a first aspect of the present disclosure includes a transmission/reception unit that transmits/receives a signal to/from a different communication apparatus; and a recovery signal transmission instruction unit that instructs the transmission/reception unit to transmit a recovery signal for recovering communication with the different communication apparatus that is out of working order, the recovery signal including at least a first command, the first command prescribing that no processing is to be executed in the different communication apparatus that is in working order.

A communication method or program according to the first aspect of the present disclosure includes transmitting/receiving a signal to/from a different communication apparatus; and transmitting a recovery signal for recovering communication with the different communication apparatus that is out of working order, the recovery signal including at least a first command, the first command prescribing that no processing is to be executed in the different communication apparatus that is in working order.

In the first aspect of the present disclosure, a signal is transmitted/received to/from a different communication apparatus; and a recovery signal for recovering communication with the different communication apparatus that is out of working order is transmitted, the recovery signal including at least a first command, the first command prescribing that no processing is to be executed in the different communication apparatus that is in working order.

A communication apparatus according to a second aspect of the present disclosure includes a transmission/reception unit that transmits/receives a signal to/from a different communication apparatus; a command determination unit that determines content of a command contained in the signal received by the transmission/reception unit and instructs to perform processing on the basis of the command; and a recovery processing unit that executes processing of recovering communication with the different communication apparatus when the signal received by the transmission/reception unit has an error, the transmission/reception unit stops responding to the different communication apparatus, and the transmission/reception unit has received a recovery signal for recovering communication, in which the recovery signal includes at least a first command, the first command prescribing that no processing is to be executed in the different communication apparatus that is in working order.

A communication method or program according to the second aspect of the present disclosure includes transmitting/receiving a signal to/from a different communication apparatus; determining content of a command contained in the signal received by the transmission/reception unit and instructing to perform processing on the basis of the command; and executing processing of recovering communication with the different communication apparatus when the signal received by the transmission/reception unit has an error, the transmission/reception unit stops responding to the different communication apparatus, and the transmission/reception unit has received a recovery signal for recovering communication, in which the recovery signal includes at least a first command, the first command prescribing that no processing is to be executed in the different communication apparatus that is in working order.

In the second aspect of the present disclosure, a signal is transmitted/received to/from a different communication apparatus; content of a command contained in the signal received by the transmission/reception unit is determined and it is instructed to perform processing on the basis of the command; and processing of recovering communication with the different communication apparatus is executed when the signal received by the transmission/reception unit has an error, the transmission/reception unit stops responding to the different communication apparatus, and the transmission/reception unit has received a recovery signal for recovering communication, in which the recovery signal includes at least a first command, the first command prescribing that no processing is to be executed in the different communication apparatus that is in working order.

A communication system according to a third aspect of the present disclosure includes a first communication apparatus including a first transmission/reception unit that transmits/receives a signal to/from a second communication apparatus, and a recovery signal transmission instruction unit that instructs the first transmission/reception unit to transmit a recovery signal for recovering communication with the second communication apparatus that is out of working order, the recovery signal including at least a first command, the first command prescribing that no processing is to be executed in the second communication apparatus that is in working order; and a second communication apparatus including a second transmission/reception unit that transmits/receives a signal to/from the first communication apparatus, a command determination unit that determines content of a command contained in the signal received by the second transmission/reception unit and instructs to perform processing on the basis of the command, and a recovery processing unit that executes processing of recovering communication with the first communication apparatus when the signal received by the second transmission/reception unit has an error, the second transmission/reception unit stops responding to the first communication apparatus, and the second transmission/reception unit has received a recovery signal for recovering communication.

In the communication system according to the third aspect of the present disclosure, in a first communication apparatus, a signal is transmitted/received to/from a second communication apparatus, and it is instructed to transmit a recovery signal for recovering communication with the second communication apparatus that is out of working order, the recovery signal including at least a first command, the first command prescribing that no processing is to be executed in the second communication apparatus that is in working order. On the other hand in a second communication apparatus, a signal is transmitted/received to/from the first communication apparatus, content of a command contained in the signal received by the second transmission/reception unit is determined and it is instructed to perform processing on the basis of the command, and processing of recovering communication with the first communication apparatus is executed when the signal received by the second transmission/reception unit has an error, the second transmission/reception unit stops responding to the first communication apparatus, and the second transmission/reception unit has received a recovery signal for recovering communication.

Advantageous Effects of Invention

According to an aspect of the present disclosure, it is possible to perform communication more reliably.

BRIEF DESCRIPTION OF DRAWINGS

FIG. 3 is a diagram showing an example of the waveform for transmitting an HDR termination command.

DESCRIPTION OF EMBODIMENTS

Hereinafter, specific embodiments to which the present technology is applied will be described in detail with reference to drawings.

<Configuration Example of Bus IF>

Figure 1:
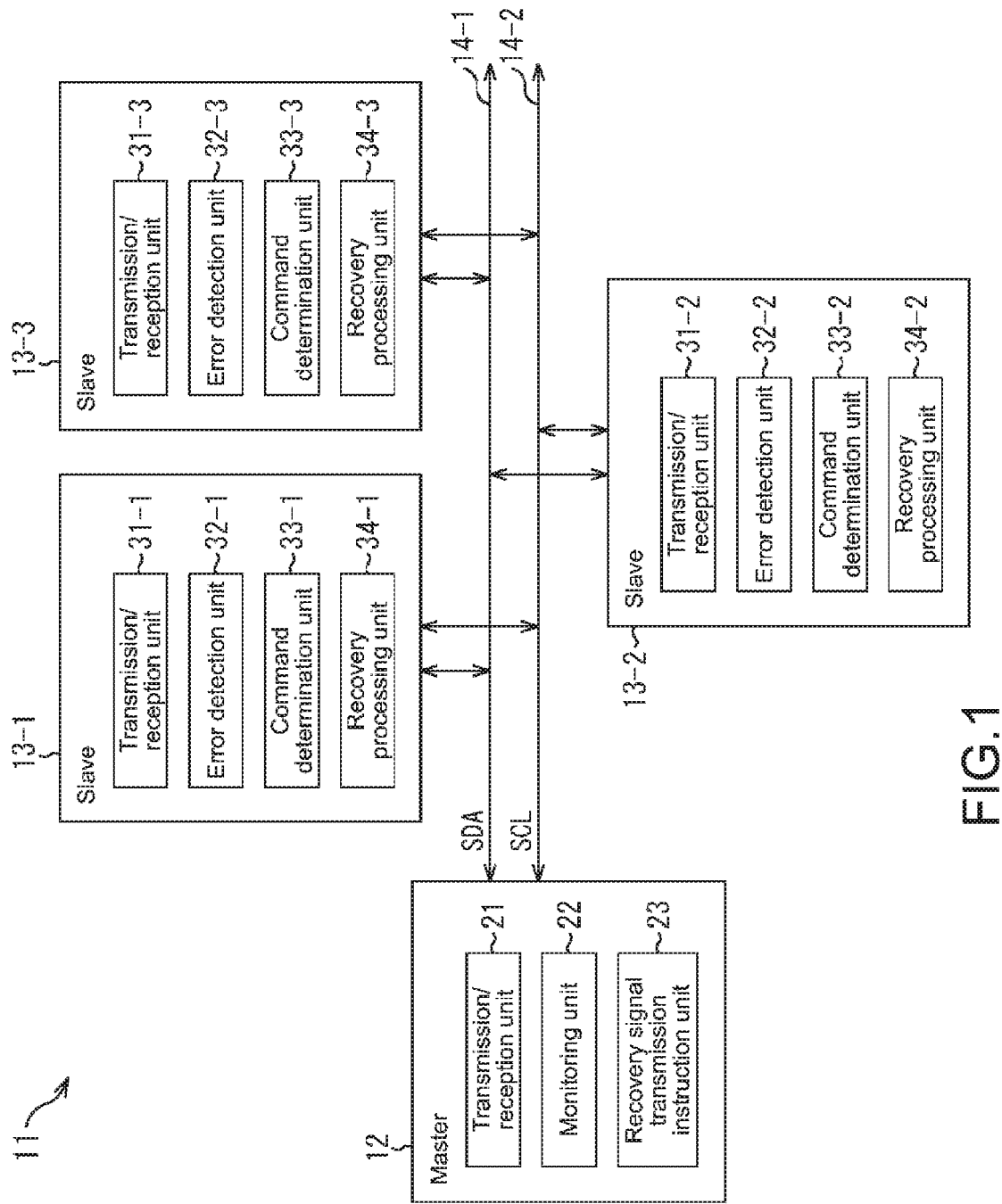
FIG. 1 is a block diagram showing a configuration example of an embodiment of a bus IF to which the present technology is applied.

FIG. 1 is a block diagram showing a configuration example of an embodiment of a bus IF to which the present technology is applied.

A bus IF 11 shown in FIG. 1 includes a master 12 and three slaves 13-1 to 13-3, which are connected to each other via a data signal line 14-1 and a clock signal line 14-2.

The master 12 takes the initiative in control in the bus IF 11, and is capable of communicating with the slaves 13-1 to 13-3 via the data signal line 14-1 and the clock signal line 14-2.

The slaves 13-1 to 13-3 are each capable of communicating with the master 12 via the data signal line 14-1 and the clock signal line 14-2 under control of the master 12. Note that the slaves 13-1 to 13-3 are configured similarly, and referred to simply as the slave 13 in the case where they do not need to be distinguished, in the following. The same shall apply to each block constituting the slave 13.

The data signal line 14-1 and the clock signal line 14-2 are used to transmit a signal between the master 12 and the slave 13. For example, in the bus IF 11, serial data (SDA) is successively transmitted one bit at a time via the data signal line 14-1, and a serial clock (SCL) having a predetermined frequency is transmitted via the clock signal line 14-2.

Further, in the bus IF 11, a plurality of transmission methods with different communication rates are prescribed, and the master 12 is capable of switching between the transmission methods. For example, in the bus IF 11, an SDR (Standard Data Rate) mode and an HDR (High DataRate) mode are prescribed depending on the transfer rate of data. Data communication is performed at a normal transfer rate in the SDR mode and data communication is performed at a transfer rate higher than that in the SDR mode in the HDR mode. Further, in the HDR mode, three modes of a DDR (Double Data Rate) mode, a TSP (Ternary Symbol Pure-Bus) mode, and a TSL (Ternary Symbol Legacy-inclusive-Bus) mode are defined by the standards. Note that in the bus IF 11, it is prescribed that communication is performed in the SDR mode when the communication is started.

The master 12 includes a transmission/reception unit 21, a monitoring unit 22, and a recovery signal transmission instruction unit 23.

The transmission/reception unit 21 transmits/receives a signal to/from the slave 13 via the data signal line 14-1 and the clock signal line 14-2. For example, the transmission/reception unit 21 transmits a signal to the slave 13 by driving the data signal line 14-1 (switching the potential to an H level or L level) in accordance with timing of serial clocks transmitted by driving the clock signal line 14-2. Further, the transmission/reception unit 21 receives a signal transmitted from the slave 13 that drives the data signal line 14-1 in accordance with timing of serial clocks of the clock signal line 14-2. Note that the driving of the clock signal line 14-2 is performed by the side of the master 12.

The monitoring unit 22 monitors the communication state of the bus IF 11, and determines whether or not there is the slave 13 that is out of working order, for example. For example, in the bus IF 11, it is prescribed that the slave 13 makes a response to a predetermined command transmitted from the master 12 to the slave 13 by transmitting ACK (Acknowledge) to the master 12, and thus, it is confirmed that the command is successfully received. Therefore, the monitoring unit 22 transmits a read command to a predetermined slave 13 a predetermined number of times in the case where there is no response from that slave 13, for example, before the monitoring unit 22 is capable of determining that that slave 13 is out of working order in the case where there is still no response from that slave 13.

In the case where the monitoring unit 22 has determined that there is the slave 13 that is out of working order, the recovery signal transmission instruction unit 23 instructs the transmission/reception unit 21 to transmit a recovery signal (see FIG. 2) for recovering the operation to all of the slaves 13. The transmission/reception unit 21 transmits the recovery signal in accordance with the instruction, and thus, the communication of the slave 13 that is out of working order can be recovered.

The slave 13 includes a transmission/reception unit 31, an error detection unit 32, a command determination unit 33, and a recovery processing unit 34.

The transmission/reception unit 31 transmits/receives a signal to/from the master 12 via the data signal line 14-1 and the clock signal line 14-2. For example, the transmission/reception unit 31 receives a signal transmitted from the master 12 that drives the data signal line 14-1 in accordance with timing of serial clocks of the clock signal line 14-2. Further, the transmission/reception unit 31 transmits a signal to the master 12 by driving the data signal line 14-1 in accordance with timing of serial clocks of the clock signal line 14-2.

The error detection unit 32 detects an error that has occurred in the signal received by the transmission/reception unit 31 by performing parity check or cyclic redundancy check (CRC) on the signal received by the transmission/reception unit 31, or collating a bit sequence constituting the command, for example. Then, in the case where the error detection unit 32 detects that an error has occurred in the signal received by the transmission/reception unit 31, for example, the error detection unit 32 is capable of making a response to the error, e.g., requesting retransmission of the command. Further, in the case where the signal received by the transmission/reception unit 31 has an error and it is difficult to perform normal communication, for example, the error detection unit 32 ignores the subsequent communication, stops responding to the master 12, and causes the slave 13 to be in a standby state.

The command determination unit 33 determines the content of the command contained in the signal received by the transmission/reception unit 31, and instructs the respective processing execution units (not shown), which execute processing corresponding to the content of the command, to execute processing on the basis of the command.

The recovery processing unit 34 determines whether or not the transmission/reception unit 31 has received the recovery signal (see FIG. 2) transmitted from the master 12. Then, in the case where the recovery processing unit 34 determines that the transmission/reception unit 31 has received the recovery signal, the recovery processing unit 34 executes processing of recovering the communication with the master 12, e.g., recovering processing of recovering the slave 13 to a standby state in which the slave 13 stands by until the master 12 declares the start of communication.

The bus IF 11 is configured as described above, the master 12 is capable of recovering the communication of the slave 13 by transmitting the recovery signal when the slave 13 stops responding to the master 12 and is out of working order.

<Description of Recovery Signal>

The recovery signal will be described with reference to FIG. 2.

Figure 2:
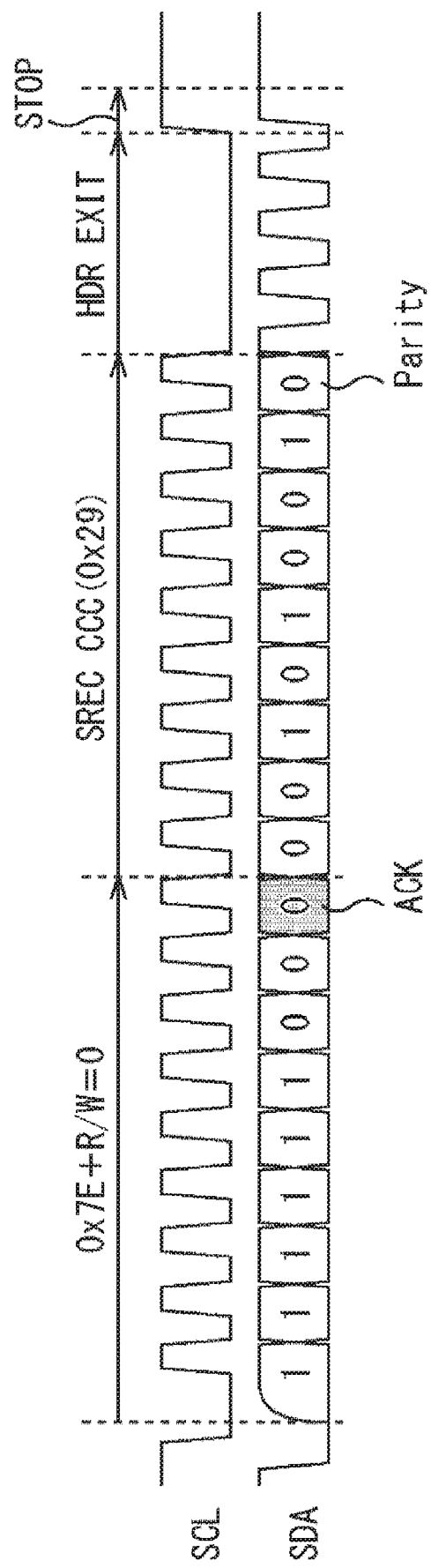
FIG. 2 is a diagram showing an example of the waveform of a recovery signal.

In FIG. 2, an example of the waveform of the recovery signal transmitted from the master 12 to the slave 13 is shown.

As shown in FIG. 2, the recovery signal has a configuration in which a stop condition (STOP), which declares the termination of communication, is output right after a broadcast command (0x7E+R/W=−0), a common command code (SREC CCC(0x29)), and an HDR termination command (HDR Exit) are sequentially transmitted.

The broadcast command is a command that notifies that the common command code to be concurrently transmitted to all of the slaves 13 constituting the bus IF 1 is transmitted following the broadcast command. Note that the last one bit of the broadcast command is ACK transmitted by the slave 13 that has successfully received the broadcast command.

The common command code is a command that is concurrently transmitted to all of the slaves 13 constituting the bus IF 11, and prescribes an instruction to be performed in the slave 13 for each common command code. Note that the last one bit of the common command code is a parity bit used for checking an error of the common command code.

In the common command code (SREC CCC(0x29)), it is prescribed that no processing is to be executed in the slave 13 that is in working order. Therefore, the command determination unit 33 of the slave 13 that has received the common command code (SREC CCC(0x29)) stands by for transmission of the next command without instructing the processing execution unit, for example.

The HDR termination command instructs the slave 13 to terminate the HDR mode, e.g., transit from the HDR mode to the SDR mode used when communication is started.

The stop condition is a signal for declaring the termination of communication (termination signal of the SDR mode), and the slave 13 that has detected the stop condition is in the standby state in which the slave 13 stands by until the master 12 starts communication.

In the case where there is the slave 13 that is out of working, the master 12 is capable of recovering the communication of the slave 13 by transmitting such a recovery signal.

For example, in the case where the HDR termination command received by a predetermined slave 13 has an error when the communication in the bus IF 11 transits from the HDR mode to the SDR mode, the slave 13 executes processing in the HDR mode. At this time, because the master 12 is in the SDR mode, it is hard for the master 12 to perform communication with the slave 13 in the HDR mode, and the slave 13 stops responding to the master 12 and is in the standby state.

In the case where the master 12 transmits the recovery signal in such a situation, the slave 13 in the HDR mode is capable of transiting from the HDR mode to the SDR mode in accordance with the HDR termination command contained in the recovery signal, and recovering the communication.

Further, even in the case of the slave 13 in the SDR mode, the signal has an error and the slave 13 stops responding to the master 12 and is in the standby mode in some cases. Such a slave 13 detects the stop condition output at the end of the recovery signal, and can be in the standby state in which the slave 13 stands by until the master 12 starts communication.

The recovery signal shown in FIG. 2 can be transmitted in a shorter time, and in the bus IF 11, it is possible to make the time necessary for recovering the communication of the slave 13 that is out of working order shorter than ever before. Further, by using the recovery signal, it is possible to prevent the slave 13 that is in working order from malfunctioning.

In FIG. 3, an example of the waveform for recovering the communication of the slave 13 by transmitting the HDR termination command to the slave 13 in the HDR mode, for example, is shown.

In the past, in order to transmit the HDR termination command, there has been a need to transit to the HDR mode. Therefore, the master 12 transmits the HDR start command (ENTHDR CCC(0x20)) for instructing to start the HDR mode after transmitting the broadcast command (0x7E+R/W=0) first. Accordingly, the master 12 transits from the SDR mode to the HDR mode, and is capable of transmitting the HDR termination command (HDR Exit) after performing data transmission (transmission of a DDR command, DDR data, etc.) in the DDR mode that is one of the HDR mode.

As shown in FIG. 3, in order to transmit the HDR termination command, the master 12 has needed to transmit a command in the HDR mode, in the past. There is fear that this command makes the slave 13 that is in working order malfunction.

For example, when the master 12 transmits a write command of the HDR mode, malfunction in which unintended writing is performed on the register of the slave 13 that is in working order is supposed to occur. Further, in the case where the slave 13 that is in working order is provided with a read clear register, malfunction in which the register is unintentionally changed is supposed to occur when the master 12 transmits a read command of the HDR mode. Further, when the master 12 transmits a pattern that is not prescribed in the standards instead of the commands, unexpected malfunction is supposed to occur depending on the mounting of the slave 13 that is in working order.

On the other hand, in the case of the recovery signal described with reference to FIG. 2, these malfunctions are prevented from occurring because an unnecessary write command or read command is not transmitted. Further, even when the slave 13 that is in working order receives the common command code (SREC CCC(0x29)) contained in the recovery signal, no processing is performed. Therefore, no malfunction occurs, similarly.

Therefore, in the bus IF 11, it is possible to recover the communication of the slave 13 that is out of working order in a short time, and perform communication more reliably by preventing the slave 13 that is in working order from malfunctioning.

<Communication Method of Recovering Communication of Slave that is Out of Working Order>

Figure 4:
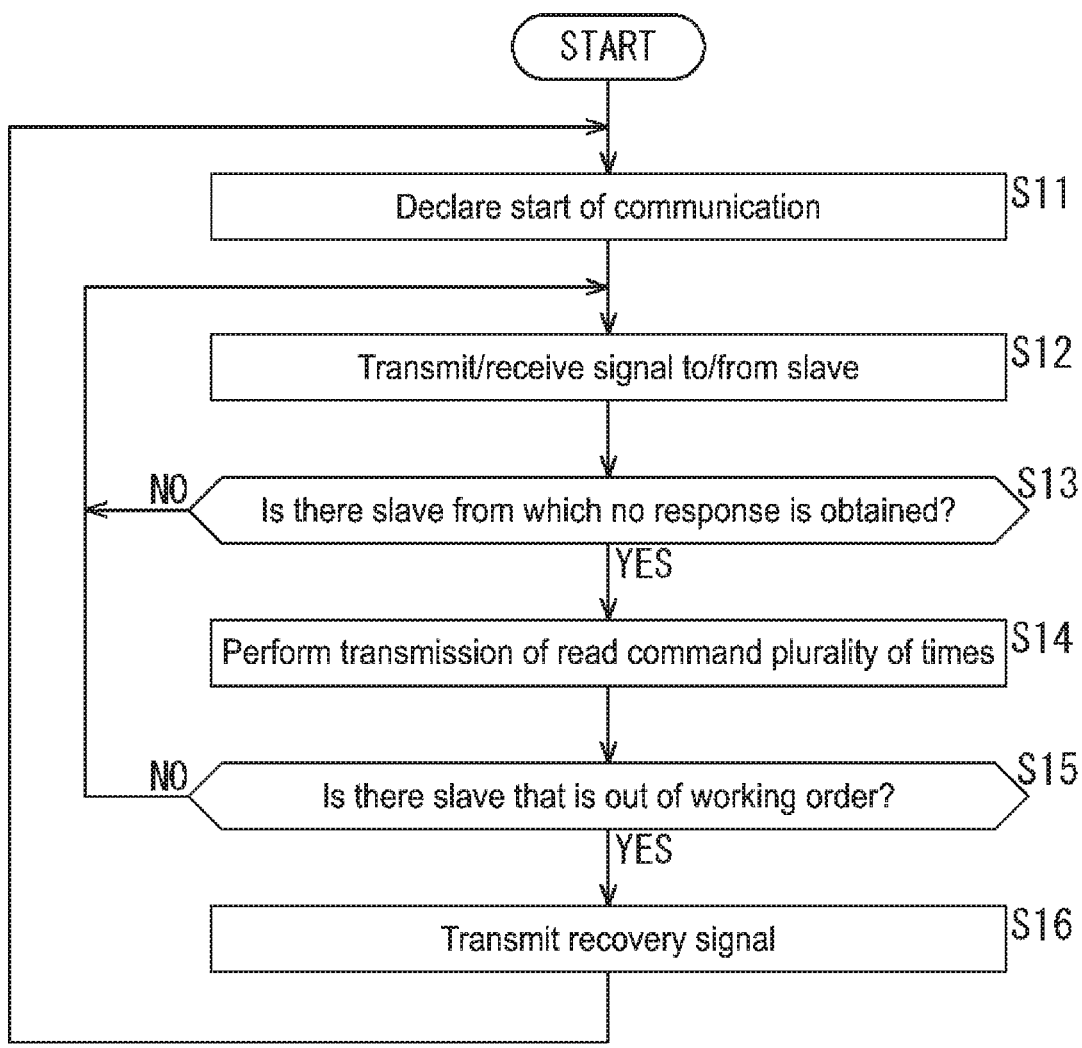
FIG. 4 is a flowchart describing communication processing executed in a master.

FIG. 4 is a flowchart describing communication processing executed in the master 12.

For example, when an upper control apparatus (not shown) instructs the master 12 to perform communication, processing is started. Then, in Step S11, the transmission/reception unit 21 drives the data signal line 14-1 and the clock signal line 14-2, outputs a start condition (drives the data signal line 14-1 from the H level to the L level in the state where the clock signal line 14-2 is at the H level), and declares start of communication.

In Step S12, the transmission/reception unit 21 transmits/receives a signal to/from the slave 13 via the data signal line 14-1 and the clock signal line 14-2.

In Step S13, the monitoring unit 22 determines whether or not there is the slave 13 from which no response is obtained on the basis of the monitoring result of the communication state of the bus IF 11. In the case where the monitoring unit 22 determines that there is no slave 13 from which no response is obtained in Step S13. i.e., responses are obtained from all of the slaves 13 constituting the bus IF 11, the processing returns to Step S12, the communication with the slave 13 is continued thereafter, similarly, and the communication is normally finished before the processing returns to Step S11 and new communication can be started.

On the other hand, in the case where the monitoring unit 22 determines that there is the slave 13 from which no response is obtained in Step S13, the processing proceeds to Step S14.

In Step S14, the monitoring unit 22 instructs the transmission/reception unit 21 to perform transmission of a read command to the slave 13 from which no response is obtained a plurality of times, and the transmission/reception unit 21 transmits the read command.

In Step S15, the monitoring unit 22 determines whether or not there is the slave 13 that is out of working order on the basis of the monitoring result of the communication state of the bus IF 11.

For example, when a response to the read command transmitted a plurality of times in Step S14 is obtained from the slave 13, the monitoring unit 22 determines that there is no slave 13 that is out of working order in Step S15. Specifically, the monitoring unit 22 determines that the slave 13 is in working order in Step S15, the processing returns to Step S12, the communication with the slave 13 is continued thereafter, similarly, and the communication is normally finished before the processing returns to Step S11 and new communication can be started.

On the other hand, when no response to the read command transmitted a plurality of times in Step S14 is obtained from the slave 13, the monitoring unit 22 determines that there is the slave 13 that is out of working order in Step S15, and the processing proceeds to Step S16.

In Step S16, the recovery signal transmission instruction unit 23 instructs the transmission/reception unit 21 to transmit the recovery signal in response to the determination of the monitoring unit 22, in which there is the slave 13 that is out of working order, in Step S15. In accordance with this instruction, the transmission/reception unit 21 transmits the recovery signal before the processing returns to Step S11 and the master 12 is capable of restarting communication from the beginning.

Figure 5:
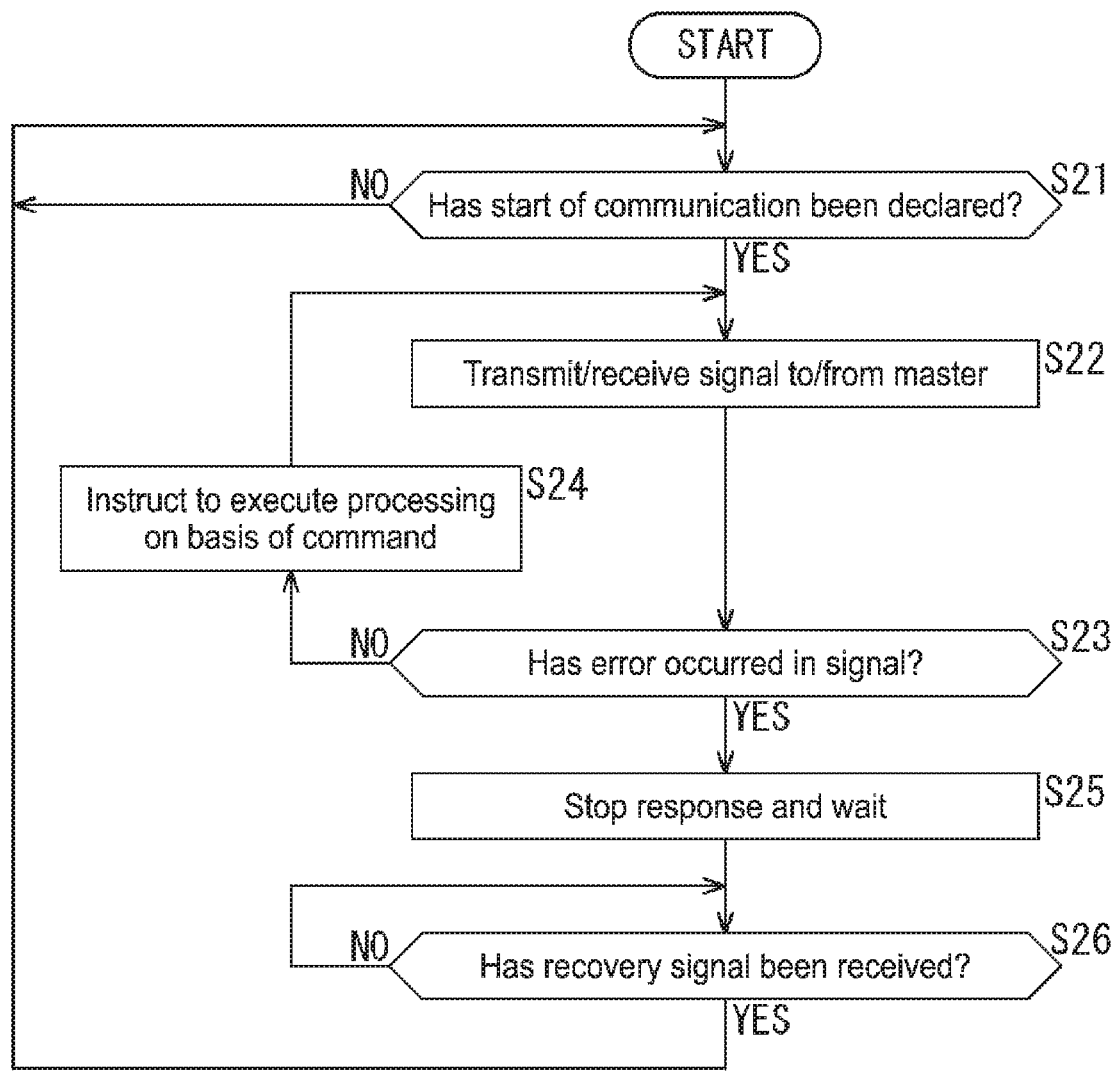
FIG. 5 is a flowchart describing communication processing executed in a slave.

FIG. 5 is a flowchart describing communication processing executed in the slave 13.

For example, the slave 13 is in the standby state in which the slave 13 stands by until the master 12 starts communication. In Step S21, the transmission/reception unit 31 determines whether or not the master 12 has declared the start of communication, and stands by without executing processing until it is determined that the master 12 has declared the start of communication.

For example, when a start condition output from the master 12 in Step S11 in FIG. 4 is detected, the transmission/reception unit 31 determines that the master 12 has declared the start of communication in Step S21, and the processing proceeds to Step S22.

In Step S22, the transmission/reception unit 31 transmits/receives a signal to/from the master 12 via the data signal line 14-1 and the clock signal line 14-2.

In Step S23, the error detection unit 32 determines whether or not the signal received by the transmission/reception unit 31 has an error.

In the case where the error detection unit 32 determines that the signal received by the transmission/reception unit 31 has no error in Step S23, specifically, the signal received by the transmission/reception unit 31 is a normal one, the processing proceeds to Step S24.

In Step S24, the command determination unit 33 determines the content of the command contained in the signal received by the transmission/reception unit 31, and instructs the respective processing execution units (not shown), which execute processing corresponding to the content of the command, to execute processing on the basis of the command. Note that in the case where the transmission/reception unit 31 has received the recovery signal, because the slave 13 is in working order in accordance with the common command code (SREC CCC(0x29)) in FIG. 2, the command determination unit 33 executes no processing and stands by for transmission of the next command in Step S24. After that, the processing returns to Step S22, the communication of the master 12 is continued thereafter, similarly, and the communication is normally finished before the processing returns to Step S21 and the transmission/reception unit 31 is capable of standing by until new communication is started.

On the other hand, in the case where the error detection unit 32 determines that the signal received by the transmission/reception unit 31 has an error in Step S23, the processing proceeds to Step S25, and the error detection unit 32 stops responding to the master 12 and causes the slave 13 to be in the standby state.

In Step S26, the recovery processing unit 34 determines whether or not the transmission/reception unit 31 has received the recovery signal transmitted from the master 12, and stands by without executing processing until it is determined that the transmission/reception unit 31 has received the recovery signal transmitted from the master 12.

Then, when the recovery processing unit 34 determines that the transmission/reception unit 31 has received the recovery signal transmitted from the master 12 in Step S26, the processing returns to Step S21 and the slave 13 is in the standby state in which the slave 13 stands by until the master 12 starts communication.

As described above, since the master 12 transmits the recovery signal, it is possible to recover the communication of the slave 13 that is out of working order in a short time and prevent the slave 13 that is in working order from malfunctioning. Therefore, the master 12 and the slave 13 are capable of performing communication more reliably.

Note that for example, the pattern of the common command code contained in the recovery signal is not limited to the pattern (0x29) shown in FIG. 2, and another pattern may be used for the common command code in which it is prescribed that no processing is performed. Further, between the common command code (SREC CCC(0x29)) and the HDR termination command, another signal that causes no malfunction to occur may be transmitted.

Further, in the recovery signal, it does not necessarily need to use the format shown in FIG. 2. For example, in the bus IF 11, it is possible to use the recovery signal with a shorter pattern, which instructs the slave 13 that is out of working order to transit from the HDR mode, instead of the recovery signal in the format shown in FIG. 2.

Figure 6:
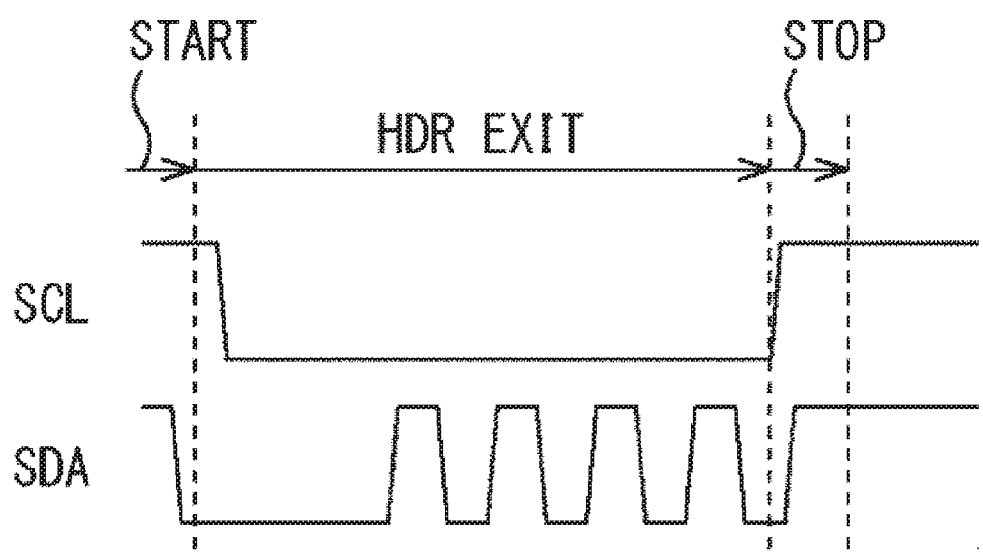
FIG. 6 is a diagram showing another example of the waveform of the recovery signal.

Specifically, as shown in FIG. 6, in the bus IF 11, it is possible to use, as the format of the recovery signal, a format in which the HDR termination command (HDR EXIT) is transmitted right after a start condition (START) that declares the start of communication is output, before a stop condition (STOP) is output. Accordingly, it is possible to recover the communication of the slave 13 that is hard to transit from the HDR mode and stops the response.

Further, when the master 12 recognizes that it is difficult to perform communication with the slave 13 in the HDR mode, it is possible to recover the communication of the slave 13 only by transmitting the HDR termination command following the common command code (SREC CCC (0x29)). Further, when the master 12 recognizes that the slave 13 in the SDR mode stops the response, it is possible to recover the communication of the slave 13 only by transmitting the stop condition following the common command code (SREC CCC(0x29)).

Note that the present technology is not limited to the bus IF 11 in accordance with the I3C standards, and can be applied to the bus IF 11 in accordance with other standards. Further, although a configuration example in which the slaves 13-1 to 13-3 are connected to each other in the bus IF 11 shown in FIG. 1 is shown, the number of slaves 13 may be one, two, or three or more, for example.

Note that the processing described with reference to the above-mentioned flowcharts does not necessarily need to be performed in time series in the order described as the flowcharts and also includes processing that are carried out in parallel or individually (e.g., parallel processing or processing that uses object). Further, the program may be processed by one CPU, or may be processed dispersively by a plurality of CPUs.

Further, the "system" means an entire apparatus including a plurality of apparatuses herein.

Further, the above-mentioned sequence of processing can be executed by hardware or software. If the sequence of processing is executed by software, programs configuring the software are installed into a computer from a program recording medium in which the programs are stored. Here, the computer includes a computer incorporated in dedicated hardware and, for example, a generally-used personal computer that installs various programs to be able to execute various functions.

<Configuration Example of Hardware>

Figure 7:
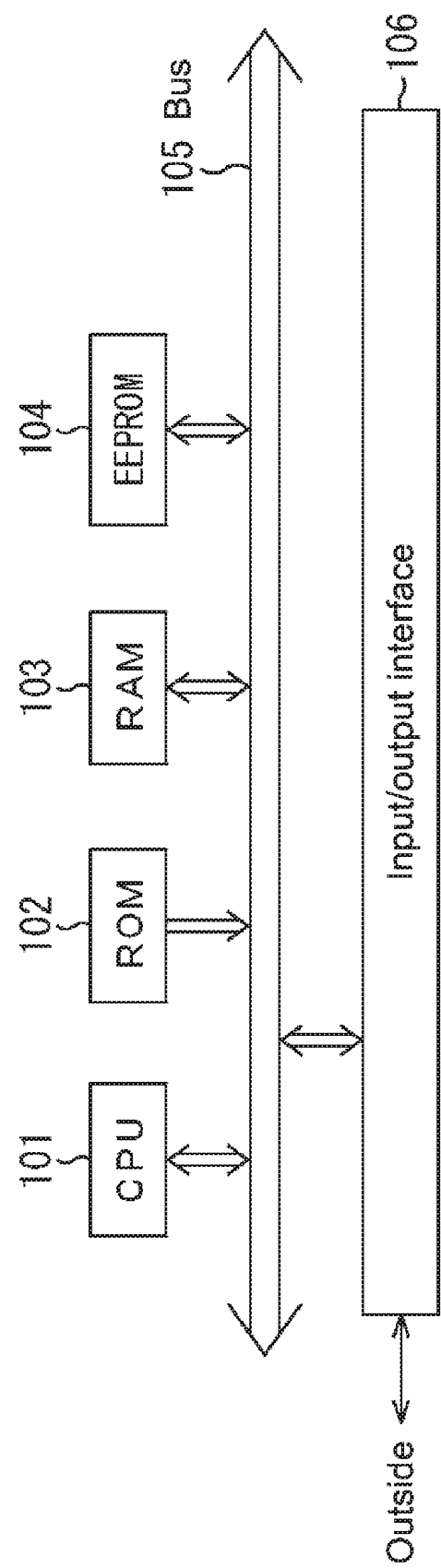
FIG. 7 is a block diagram showing a configuration example of an embodiment of a computer to which the present technology is applied.

FIG. 7 is a block diagram showing a configuration example of hardware of a computer that executes the above-mentioned sequence of processing by programs.

In the computer, a CPU (Central Processing Unit) 101, a ROM (Read Only Memory) 102, a RAM (Random Access Memory) 103, and an EEPROM (Electronically Erasable and Programmable Read Only Memory) 104 are mutually connected via a bus 105. To the bus 105, further connected is an input/output interface 106. The input/output interface 106 is connected to the outside (e.g., the data signal line 14-1 and the clock signal line 14-2 in FIG. 1).

In the computer configured as described above, by the CPU 101 loading programs stored in, for example, the ROM 102 and the EEPROM 104 into the RAM 103 via the bus 105 and executing the programs, the above-mentioned sequence of processing is performed. Further, the programs executed by the computer (CPU 101) can be stored in the ROM 102 in advance. Alternatively, the programs can be installed into the EEPROM 104 from the outside via the input/output interface 106 or updated.

It should be noted that the present technology may take the following configurations.

(1)

A communication apparatus, including:

a transmission/reception unit that transmits/receives a signal to/from a different communication apparatus; and a recovery signal transmission instruction unit that instructs the transmission/reception unit to transmit a recovery signal for recovering communication with the different communication apparatus that is out of working order, the recovery signal including at least a first command, the first command prescribing that no processing is to be executed in the different communication apparatus that is in working order.

(2)

The communication apparatus according to (1) above, in which the transmission/reception unit is capable of performing communication with the different communication apparatus in a plurality of communication modes with different communication rates, and transmits the recovery signal, a second command being transmitted following the first command in the recovery signal, the second command instructing to terminate a particular communication mode of the plurality of communication modes.

(3)

The communication apparatus according to (2) above, in which the transmission/reception unit outputs a signal for declaring termination of communication in a communication mode different from the particular communication mode right after the second command is transmitted.

(4)

The communication apparatus according to any one of (1) to (3), in which the different communication apparatus includes a plurality of different communication apparatuses, and the transmission/reception unit transmits a broadcast command for notifying of transmission of a command to be concurrently transmitted to all of the plurality of different communication apparatuses right before transmitting the first command.

(5)

The communication apparatus according to any one of (1) to (4) above, further including a monitoring unit that monitors communication with the different communication apparatus, the different communication apparatus including a plurality of different communication apparatuses, the monitoring unit determining whether or not there is the different communication apparatus that is out of working order.

(6)

The communication apparatus according to (3) above, in which as a format of the recovery signal, a format that includes a signal declaring start of communication, the second command, and a signal declaring termination of the communication is used instead of a format including the first command.

(7)

A communication method, including:

transmitting/receiving a signal to/from a different communication apparatus; and transmitting a recovery signal for recovering communication with the different communication apparatus that is out of working order, the recovery signal including at least a first command, the first command prescribing that no processing is to be executed in the different communication apparatus that is in working order.

(8)

A program that causes a computer to execute communication processing including the steps of:

transmitting/receiving a signal to/from a different communication apparatus; and transmitting a recovery signal for recovering communication with the different communication apparatus that is out of working order, the recovery signal including at least a first command, the first command prescribing that no processing is to be executed in the different communication apparatus that is in working order.

(9)

A communication apparatus, including:

a transmission/reception unit that transmits/receives a signal to/from a different communication apparatus;

a command determination unit that determines content of a command contained in the signal received by the transmission/reception unit and instructs to perform processing on the basis of the command; and a recovery processing unit that executes processing of recovering communication with the different communication apparatus when the signal received by the transmission/reception unit has an error, the transmission/reception unit stops responding to the different communication apparatus, and the transmission/reception unit has received a recovery signal for recovering communication, in which the recovery signal includes at least a first command, the first command prescribing that no processing is to be executed in the different communication apparatus that is in working order.

(10)

The communication apparatus according to (9) above, in which the command determination unit executes no processing in accordance with the first command and stands by for reception of a next command when the transmission/reception unit has received the recovery signal.

(11)

The communication apparatus according to (9) or (10) above, in which the transmission/reception unit is capable of performing communication with the different communication apparatus in a plurality of communication modes with different communication rates, and a second command is transmitted following the first command in the recovery signal, the second command instructing to terminate a particular communication mode of the plurality of communication modes.

(12)

The communication apparatus according to (11) above, in which in the recovery signal, a signal for declaring termination of communication in a communication mode different from the particular communication mode is output right after the second command is transmitted.

(13)

The communication apparatus according to any one of (9) to (12) above, in which the different communication apparatus includes a plurality of different communication apparatuses, and in the recovery signal, a broadcast command for notifying of transmission of a command to be concurrently transmitted to all of the plurality of different communication apparatuses is transmitted right before transmitting the first command.

(14)

The communication apparatus according to any one of (9) to (13) above, further including an error detection unit that detects that the signal received by the transmission/reception unit has an error, and then stops responding to the different communication apparatus.

(15)

The communication apparatus according to (12) above, in which as a format of the recovery signal, a format that includes a signal declaring start of communication, the second command, and a signal declaring termination of the communication is used instead of a format including the first command.

(16)

A communication method, including:

transmitting/receiving a signal to/from a different communication apparatus;

determining content of a command contained in the signal received by the transmission/reception unit and instructing to perform processing on the basis of the command; and executing processing of recovering communication with the different communication apparatus when the signal received by the transmission/reception unit has an error, the transmission/reception unit stops responding to the different communication apparatus, and the transmission/reception unit has received a recovery signal for recovering communication, in which the recovery signal includes at least a first command, the first command prescribing that no processing is to be executed in the different communication apparatus that is in working order.

(17)

A program that causes a computer to execute communication processing including the steps of:

transmitting/receiving a signal to/from a different communication apparatus;

determining content of a command contained in the signal received by the transmission/reception unit and instructing to perform processing on the basis of the command; and executing processing of recovering communication with the different communication apparatus when the signal received by the transmission/reception unit has an error, the transmission/reception unit stops responding to the different communication apparatus, and the transmission/reception unit has received a recovery signal for recovering communication, in which the recovery signal includes at least a first command, the first command prescribing that no processing is to be executed in the different communication apparatus that is in working order.

(18)

A communication system, including:

a first communication apparatus including a first transmission/reception unit that transmits/receives a signal to/from a second communication apparatus, and a recovery signal transmission instruction unit that instructs the first transmission/reception unit to transmit a recovery signal for recovering communication with the second communication apparatus that is out of working order, the recovery signal including at least a first command, the first command prescribing that no processing is to be executed in the second communication apparatus that is in working order; and a second communication apparatus including a second transmission/reception unit that transmits/receives a signal to/from the first communication apparatus, a command determination unit that determines content of a command contained in the signal received by the second transmission/reception unit and instructs to perform processing on the basis of the command, and a recovery processing unit that executes processing of recovering communication with the first communication apparatus when the signal received by the second transmission/reception unit has an error, the second transmission/reception unit stops responding to the first communication apparatus, and the second transmission/reception unit has received a recovery signal for recovering communication.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 11 bus IF
12 master
13 slave
14-1 data signal line
14-2 clock signal line
21 transmission/reception unit
22 monitoring unit
23 recovery signal transmission instruction unit
31 transmission/reception unit
32 error detection unit
33 command determination unit
34 recovery processing unit

The invention claimed is:

1. A communication device, comprising:
transmission and reception circuitry configured to communicate with an external communication device; and
control circuitry configured to cause the transmission and reception circuitry to transmit a recovery signal including a first command, wherein
in a case where the external communication device is out of working order, the recovery signal restores communication with the external communication device,
in a case where the external communication device is in working order, the recovery signal prescribes that no restoring is to be executed in the external communication device,
the transmission and reception circuitry is configured to communicate in at least a Standard Data Rate (SDR) mode and a High Data Rate (HDR) mode, data communication being performed at a first transfer rate in the SDR mode and being performed at a second transfer rate higher than the first transfer rate in the HDR mode, and
the recovery signal includes a second command, the second command prescribing the external communication device to terminate the HDR mode.

2. The communication device according to claim 1, wherein the first command is a broadcast command.

3. The communication device according to claim 1, wherein the recovery signal includes a third command following the second command, the third command declaring a termination of communication.

4. The communication device according to claim 1, wherein the control circuitry is configured to monitor communication with the external communication apparatus, and configured to determine whether the external communication apparatus is in working order.

5. The communication device according to claim 4, wherein whether the external communication device is in working order or out of working order is based on a presence of an error in a command other than the recovery signal.

6. The communication device according to claim 4, wherein whether the external communication device is in working order or out of working order is based on the absence of a response to a read command transmitted a plurality of times.

7. The communication device according to claim 4, wherein whether the external communication device is in working order or out of working order is based on a parity check in a command other than the recovery signal.

8. The communication device according to claim 1, wherein, in the case where the external communication device is out of working order, the recovery signal causes the external communication device to ignore subsequent communication.

9. A communication device, comprising:
transmission and reception circuitry configured to communicate with an external communication device; and
control circuitry configured to determine whether a received signal is a recovery signal including a first command, wherein
in a case where the communication device is out of working order, the recovery signal causes the control circuitry to restore communication with the external communication device,
in a case where the communication device is in working order, the recovery signal prescribes that no restoring is to be executed in the communication device,
the transmission and reception circuitry is configured to communicate in at least a Standard Data Rate (SDR) mode and a High Data Rate (HDR) mode, data communication being performed at a first transfer rate in the SDR mode and being performed at a second transfer rate higher than the first transfer rate in the HDR mode, and
the recovery signal includes a second command, the second command prescribing the communication device to terminate the HDR mode.

10. The communication device according to claim 9, wherein the first command is a broadcast command.

11. The communication device according to claim 9, wherein the recovery signal includes a third command following the second command, the third command declaring a termination of communication.

12. The communication device according to claim 9, wherein the control circuitry is configured to detect an error in communication with the external communication device in a command other than the recovery signal.

13. The communication device according to claim 12, wherein the control circuitry is configured to detect the error based on a parity check in a command other than the recovery signal.

14. The communication device according to claim 9, wherein, in the case where the communication device is out of working order, the recovery signal causes the communication device to ignore subsequent communication.

15. A communication system, comprising:
a first communication device, including:
first transmission and reception circuitry configured to communicate, and
control circuitry configured to instruct the first transmission and reception circuitry to transmit a recovery signal including a first command; and
a second communication device including second transmission and reception circuitry configured to communicate with the first communication device and to receive the recovery signal, wherein
in a case where the second communication device is out of working order, the recovery signal restores communication with the second communication device,
in a case where the second communication device is in working order, the recovery signal prescribes that no restoring is to be executed in the second communication device,
the first transmission and reception circuitry is configured to communicate in at least a Standard Data Rate (SDR) mode and a High Data Rate (HDR) mode, data communication being performed at a first transfer rate in the SDR mode and being performed at a second transfer rate higher than the first transfer rate in the HDR mode, and
the recovery signal includes a second command, the second command prescribing the second communication device to terminate the HDR mode.

16. The communication system according to claim 15, further comprising:
at least one third communication device configured to communicate with the first communication device and to receive the recovery signal, wherein
in a case where a respective third communication device is out of working order, the recovery signal restores communication with the respective third communication device, and
in a case where the respective third communication device is in working order, the recovery signal prescribes that no restoring is to be executed in the respective third communication device.

17. A communication method in a communication device, the method comprising:
communicating with an external communication device; and
transmitting a recovery signal including a first command, wherein
in a case where the external communication device is out of working order, the recovery signal restores communication with the external communication device,
in a case where the external communication device is in working order, the recovery signal prescribes that no restoring is to be executed in the external communication device,
the communicating with the external communication device is configured to be in at least one of a Standard Data Rate (SDR) mode and a High Data Rate (HDR) mode, with data communication being performed at a first transfer rate in the SDR mode and being performed at a second transfer rate higher than the first transfer rate in the HDR mode, and the recovery signal includes a second command, the second command prescribing the external communication device to terminate the HDR mode.

* * * * *